US012633106B2

(12) United States Patent
Yoshihama

(10) Patent No.: US 12,633,106 B2
(45) Date of Patent: May 19, 2026

(54) INFORMATION PROCESSING DEVICE AND INFORMATION PROCESSING METHOD

(71) Applicant: Panasonic Intellectual Property Management Co., Ltd., Osaka (JP)

(72) Inventor: Yutaka Yoshihama, Osaka (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 275 days.

(21) Appl. No.: 18/483,427

(22) Filed: Oct. 9, 2023

(65) Prior Publication Data

US 2024/0177472 A1     May 30, 2024

(30) Foreign Application Priority Data

Nov. 30, 2022     (JP) ................................. 2022-192249

(51) Int. Cl.
*G06V 10/82* (2022.01)
*G06N 3/045* (2023.01)
*G06N 3/0464* (2023.01)
*G06V 10/764* (2022.01)

(52) U.S. Cl.
CPC ............. *G06V 10/82* (2022.01); *G06N 3/045* (2023.01); *G06N 3/0464* (2023.01); *G06V 10/764* (2022.01)

(58) Field of Classification Search
CPC ....................................................... G06V 10/82
See application file for complete search history.

(56) References Cited

U.S. PATENT DOCUMENTS 10,452,980 B1 *  10/2019  Kim ........................ G06N 3/045
2018/0137406 A1 *  5/2018  Howard ................. G06N 3/082

FOREIGN PATENT DOCUMENTS

EP          3893147 A1 *  10/2021    ......... G06V 40/1388
JP     2019219804 A     12/2019

OTHER PUBLICATIONS

Howard MobileNets 2017.*

* cited by examiner

*Primary Examiner* — Ross Varndell
(74) *Attorney, Agent, or Firm* — Seed Intellectual Property Law Group LLP

(57) ABSTRACT
An information processing device includes: an inferencer that receives an image as an input and performs inference processing using a neural network model on the image received; and a postprocessor that processes result information indicating a result of the inference processing performed by the inferencer to output an output value. The inferencer includes one or more depthwise convolution (DWConv) layers each with a stride of two or more as one or more layers located closest to an input layer among a plurality of layers included in the neural network model.

8 Claims, 8 Drawing Sheets

Start

Obtain training image ～S201

Perform inference processing using NN model ～S202

Train NN model ～S203

Is accuracy greater than or equal to reference value? ～S204

No

Yes

End

92

Processor

921

Preprocessor

922

Inferencer

95

NN model

923

Postprocessor

FIG. 13

(a) Comparative example (Input side)                                                    (Output side)

| # | First layer | Second layer | Third layer | Fourth layer | ... |
|---|---|---|---|---|---|
| 1 | Conv(2) | DWConv(1) | PWConv(1) | DWConv(2) | ... |
| 2 | Conv(2) | DWConv(1) | PWConv(1) | PWConv(1) | ... |
| 3 | Conv(2) | DWConv(1) | PWConv(1) | PWConv(1) | ... |
| 4 | Conv(2) | DWConv(1) | PWConv(1) | PWConv(1) | ... |
| 5 | Conv(2) | DWConv(1) | PWConv(1) | PWConv(1) | ... |
| 6 | Conv(2) | Conv(1) | Conv(1) | Conv(2) | ... |
| 7 | Conv(2) | Conv(2) | PWConv(1) | Conv(2) | ... |

(b) Information processing device 10

(Input side)                                                    (Output side)

| # | First layer | Second layer | Third layer | Fourth layer | ... |
|---|---|---|---|---|---|
| 1 | DWConv(2) | Conv(2) | DWConv(1) | PWConv(1) | ... |
| 2 | DWConv(2) | Conv(2) | DWConv(1) | PWConv(1) | ... |
| 3 | DWConv(2) | Conv(2) | DWConv(1) | PWConv(1) | ... |
| 4 | DWConv(2) | Conv(2) | DWConv(1) | PWConv(1) | ... |
| 5 | DWConv(2) | Conv(2) | DWConv(1) | PWConv(1) | ... |
| 6 | DWConv(2) | Conv(2) | Conv(1) | Conv(1) | ... |
| 7 | DWConv(2) | Conv(2) | Conv(2) | PWConv(1) | ... |

INFORMATION PROCESSING DEVICE AND INFORMATION PROCESSING METHOD

CROSS REFERENCE TO RELATED APPLICATION

The present application is based on and claims priority of Japanese Patent Application No. 2022-192249 filed on Nov. 30, 2022.

FIELD

The present disclosure relates to an information processing device and an information processing method.

BACKGROUND

A technology in which inference processing is performed on an image using a deep neural network has been known conventionally. In such inference processing, the size of an image may be reduced in advance (see Patent Literature (PTL) 1).

CITATION LIST

Patent Literature

PTL 1: Japanese Unexamined Patent Application Publication No. 2019-219804

SUMMARY

However, the inference processing according to PTL 1 can be improved upon. In view of this, the present disclosure provides an information processing device capable of improving upon the above related art.

In view of the above, the present disclosure provides, for example, an information processing device that reduces the load of processing for adjusting an image size.

An information processing device according to one aspect of the present disclosure includes: an inferencer that receives an image as an input and performs inference processing using a neural network model on the image received; and a postprocessor that processes result information indicating a result of the inference processing performed by the inferencer to output an output value. The inferencer includes one or more depthwise convolution (DWConv) layers each with a stride of two or more as one or more layers located closest to an input layer among a plurality of layers included in the neural network model.

These general or specific aspects may be implemented using a system, a method, an integrated circuit, a computer program, or a computer-readable recording medium such as a CD-ROM, or any combination of systems, methods, integrated circuits, computer programs, and recording media.

An information processing device according to one aspect of the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 13 is an explanatory diagram showing specific configuration examples of the neural network model according to the embodiment.

Figure 1:
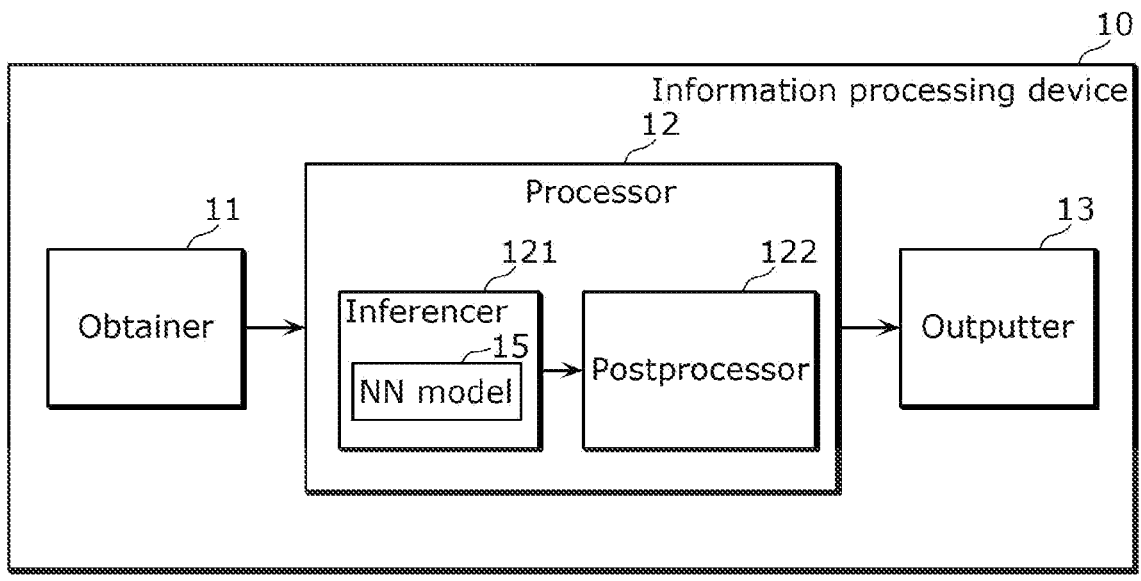
FIG. 1 is an explanatory diagram showing a configuration of an information processing device according to an embodiment.

DESCRIPTION OF EMBODIMENT (Underlying Knowledge Forming Basis of the Present Disclosure)

The inventor of the present disclosure has found that the following problems arise in connection with the processing for reducing the size of an image as described in the "Background" section.

When inference processing is performed on an image using a deep neural network, a relatively large image size (in other words, a relatively high resolution) of an inputted image results in an increase in the load of the processing using the deep neural network or an increase in the time required for the processing.

In a case where inference processing is performed using a deep neural network on images obtained at a frame rate of 30 fps, for example, the inference processing can be advantageously performed in real time if the inference processing can be performed on a single image within $\frac{1}{30}$ seconds.

In view of this, in inference processing using a deep neural network, the size of an image may be reduced in advance (see PTL 1). By performing the inference processing using the deep neural network on such a reduced image, the processing load of an information processing device can be reduced, and the time required to perform the processing can be shortened.

However, the processing for adjusting the size of an image, such as reducing the size of an image, places a relatively high load on a processor and also requires a relatively long time to be completed.

The present disclosure therefore provides, for example, an information processing device that reduces the load of the processing for adjusting the size of an image.

Exemplary aspects that can be derived from the disclosure of this specification will be described below, and effects, etc. that can be achieved from those aspects will be described below.

(1) A first aspect of the present disclosure provides an information processing device including: one or more memories; and circuitry which, in operation: receives an image as an input and performs inference processing using a neural network model on the image received; and processes result information indicating a result of the inference processing to output an output value. The neural network model includes one or more DWConv layers each with a stride of two or more as one or more layers located closest to an input layer among a plurality of layers included in the neural network model.

According to the above aspect, since the information processing device includes the one or more DWConv layers, each with a stride of two or more, located closest to the input layer in the neural network model, processing for reducing the size of the image inputted using the one or more DWConv layers and the inference processing on the reduced image using the subsequent layers may be able to be performed together using the neural network model. This is based on the fact that a DWConv layer with a stride of S (where S≥2) has a function of adjusting an inputted image by a factor of 1/S.

If the information processing device were to perform processing for reducing the size of an image before the image is inputted to the neural network model, the size reduction processing and the inference processing would be performed separately. The size reduction processing generally places a relatively high load on the processor. In addition, if the information processing device were to perform the size reduction processing and the inference processing separately, processing for calling each processing and returning processing would also be required, in addition to the load of the size reduction processing and the inference processing themselves. This leads to an increase in the load. According to the above aspect, the information processing device has no need to perform the size reduction processing on an image before the image is inputted to the neural network model, thus contributing to avoiding the increase in the processing load, which could occur if the above size reduction processing were to be performed. Therefore, the information processing device may be able to reduce the load of the processing for adjusting the size of the image.

(2) A second aspect of the present disclosure provides the information processing device according to the first aspect of the present disclosure, in which the neural network model includes one or more convolution (Conv) layers each with a stride of two or more as one or more layers subsequent to the one or more DWConv layers among the plurality of layers included in the neural network model.

According to the above aspect, the inference processing may be able to be successively performed, by the one or more Conv layers and the subsequent layers in the neural network model, on the image that has been reduced in size using the one or more DWConv layers. This allows the size reduction processing and the inference processing to be performed together using the neural network model, thus further contributing to reducing the processing load. Therefore, the information processing device may be able to further reduce the load of the processing for adjusting the size of the image.

(3) A third aspect of the present disclosure provides the information processing device according to the first or second aspect of the present disclosure, in which the circuitry receives a full high-definition image as the image.

According to the above aspect, the information processing device may be able to reduce, in the inference processing on the full high-definition image, the load of the processing for adjusting the size of the image.

(4) A fourth aspect of the present disclosure provides the information processing device according to any one of the first to third aspects of the present disclosure, in which the one or more DWConv layers are two DWConv layers.

According to the above aspect, the information processing device may be able to perform the inference processing using the subsequent layers while easily adjusting the size of the inputted image to ¼ in each of the vertical and horizontal directions through the size reduction processing using the two DWConv layers located closest to the input layer in the neural network model. Thus, the information processing device may be able to more easily reduce the load of the processing for adjusting the size of the image.

(5) A fifth aspect of the present disclosure provides an information processing method to be performed by an information processing device. The information processing method includes: receiving an image as an input and performing inference processing using a neural network model on the image received; and processing result information indicating a result of the inference processing to output an output value. The neural network model includes one or more DWConv layers each with a stride of two or more as one or more layers located closest to an input layer among a plurality of layers included in the neural network model.

According to the above aspect, the same effects as those of the above information processing device can be achieved.

(6) A sixth aspect of the present disclosure provides a non-transitory computer-readable recording medium having recorded thereon a program for causing a computer to execute the information processing method according to the fifth aspect of the present disclosure.

According to the above aspect, the same effects as those of the above information processing device can be achieved.

These general or specific aspects may be implemented using a system, a method, an integrated circuit, a computer program, or a computer-readable recording medium such as a CD-ROM, or any combination of systems, methods, integrated circuits, computer programs, or recording media.

An embodiment will be specifically described below with reference to the drawings.

Note that the embodiment to be described below provides general or specific examples. The numerical values, shapes, materials, components, arrangement positions of components, connection forms of components, steps, the order of steps, etc. shown in the following embodiment are mere examples and are not intended to limit the present disclosure. In addition, components in the following embodiment that are not described in the independent claims representing the most generic concept are described as optional components.

Embodiment

The present embodiment describes, for example, information processing device 10 that reduces the load of processing for adjusting an image size. The image size refers to, for example, the number of pixels in the vertical or horizontal direction of the image. Although such a case is described as an example, the image size is not limited to this.

Inference processing using a neural network model according to the present embodiment will be described first.

Figure 2A:
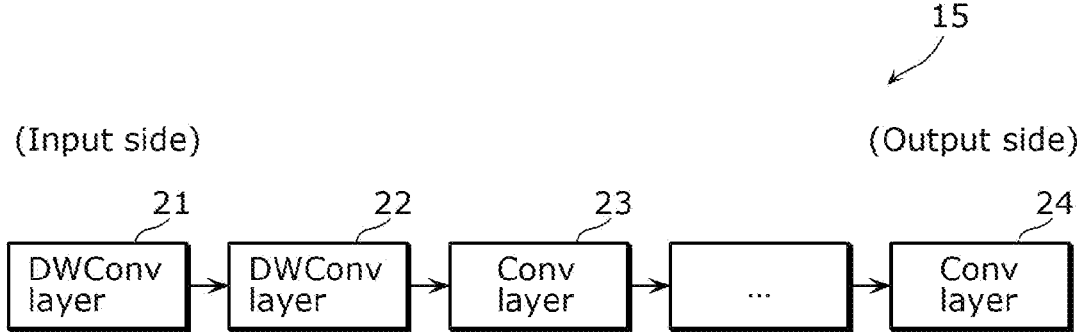
FIG. 2A is an explanatory diagram showing a configuration of a neural network model according to the embodiment.
Figure 2B:
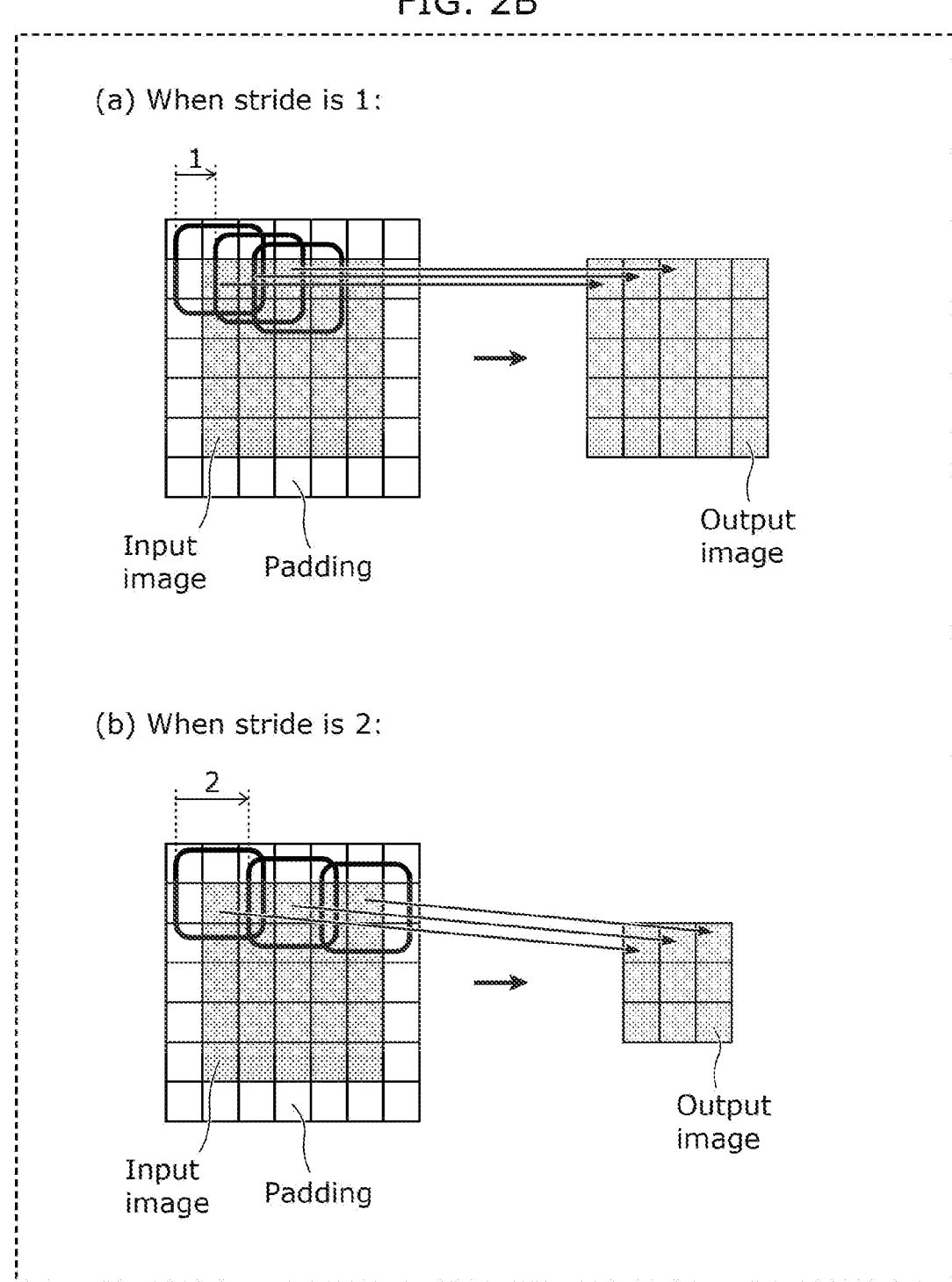
FIG. 2B is an explanatory diagram showing strides in convolution operations.

FIG. 1 is an explanatory diagram showing a configuration of information processing device 10 according to the present embodiment. FIG. 2A is an explanatory diagram showing a configuration of neural network model 15 according to the present embodiment. FIG. 2B is an explanatory diagram showing strides in convolution operations.

Information processing device 10 is shown as a configuration example of an information processing device that performs inference processing using neural network model 15.

As shown in FIG. 1, information processing device 10 according to the present embodiment includes obtainer 11, processor 12, and outputter 13. Some or all of components provided by information processing device 10 are implemented by a processor (e.g., a central processing unit (CPU)), which is provided by information processing device 10, executing a predetermined program using a memory (not shown).

Obtainer 11 obtains an image to be subject to inference processing performed by information processing device 10. The image to be subject to inference processing performed by information processing device 10 is, for example, a full high-definition image, i.e., an image of 1920 pixels×1080 pixels, but not limited to this. Obtainer 11 may obtain such an image from a device external to information processing device 10 via a communication interface (not shown) or by reading an image stored in a storage device (not shown) provided by information processing device 10. Obtainer 11 provides the obtained image to processor 12.

Processor 12 performs the inference processing using the neural network model on the image provided by obtainer 11. Processor 12 provides, to outputter 13, information indicating the result of the inference processing performed. Examples of the inference processing may include processing for detecting objects in the image and processing for recognizing characters or shapes in the image.

Processor 12 includes inferencer 121 and postprocessor 122.

Inferencer 121 receives the image as an input and performs the inference processing using neural network model (also referred to as NN model) 15 on the image received. Neural network model 15 is a deep neural network model having an input layer, intermediate layers, and an output layer.

Note that the image inputted to inferencer 121 is the image provided by obtainer 11 and is an image to which no processing for adjusting the image size (what is called preprocessing) has been applied. In other words, processor 12 includes no preprocessor (see FIG. 6) corresponding to preprocessor 921 of an information processing device according to a comparative example to be described below.

As shown in FIG. 2A, neural network model 15 includes, as intermediate layers, DWConv layers 21 and 22 and Conv layers 23 and 24, for example, from an input side toward an output side. Each layer of neural network model 15 performs an operation (e.g., a convolution operation using a filter) on an input value inputted to the layer and outputs a value obtained as a result of the operation. Note that the illustration of the input layer and the output layer is omitted in FIG. 2A.

DWConv layers 21 and 22 (also referred to as DWConv layers 21, etc.) are DWConv layers each with a stride of two. DWConv layers 21, etc. are examples of DWConv layers each with a stride of two or more.

A stride is a moving width of a filter for each convolution operation in a convolutional neural network (see FIG. 2B). The larger the stride, the smaller the output image size. Specifically, when the stride is one as shown in (a) of FIG. 2B, the output image that is the same as the input image can be obtained. However, when the stride is two as shown in (b) of FIG. 2B, the output image size is approximately ½ of the input image size.

If the input image size is divisible by the stride, the output image size becomes ½ of the input image size. On the other hand, if the input image size is indivisible by the stride, the output image size may be slightly larger than ½ of the input image size, but a difference between the output image size and ½ of the input image size is extremely small compared to the input image size or the output image size. In the above description, the output image size is stated to be approximately ½ of the input image size, including both of the above cases.

Thus, a DWConv layer with a stride of S (where S≥2) can be said to have a function of adjusting an input image size by a factor of approximately 1/S. Similarly, a plurality of DWConv layers each with a stride of S can be said to have a function of adjusting an image size by a factor of approximately $(1/S)^n$.

The same is true when the stride of DWConv layers 21, etc. is three or more. When the stride of DWConv layers 21, etc. is S (where S≥2), the output image size is approximately 1/S of the input image size.

DWConv layers 21 and 22 are DWConv layers each with a stride of two and therefore provide, to a subsequent layer, an output image with a size that is approximately ¼ of the input image size.

Conv layers 23 and 24 are layers used for the inference processing. For example, Conv layer 23 is a Conv layer with a stride of one or more, and Conv layer 24 is a Conv layer with a stride of one. Note that one or more Conv layers or pointwise convolution (PWConv) layers may be included between Conv layer 23 and Conv layer 24.

As described above, among the plurality of layers included in neural network model 15, one or more layers located closest to the input layer are characterized as one or more DWConv layers each with a stride of two or more. In the example shown in FIG. 2A, the one or more DWConv layers correspond to two DWConv layers 21 and 22.

Among the plurality of layers included in neural network model 15, one or more layers subsequent to the one or more DWConv layers located closest to the input layer may be characterized as one or more Conv layers each with a stride of two or more.

In general, such a configuration in which the DWConv layer with a stride of two or more is disposed closest to the input layer in the neural network model has been unknown. This is because if a DWConv layer that generates an image size change is disposed closest to an input layer in a neural network model, such a DWConv layer will simply reduce the size of an inputted image.

Postprocessor 122 performs postprocessing on result information indicating the result of the inference processing performed by inferencer 121. For example, if the information indicating the result of the inference processing performed by inferencer 121 is score information indicating detection probabilities of objects, postprocessor 122 generates information (text information or an image) indicating an object having relatively high score information.

Neural network model 15 has a feature of including one or more DWConv layers each with a stride of two or more as one or more layers located closest to the input layer among the plurality of layers included in neural network model 15.

Neural network model 15 also has a feature of including one or more Conv layers each with a stride of two or more as one or more layers subsequent to the one or more DWConv layers described above among the plurality of layers included in neural network model 15.

Outputter 13 outputs the result of the inference processing performed by processor 12. Outputter 13 may output such an inference result to other devices via a communication interface. If information processing device 10 is equipped with a display screen (not shown), the inference result may be outputted by displaying an image showing the inference result on the display screen. If information processing device 10 is equipped with a speaker (not shown), a voice indicating the inference result may be outputted through the speaker.

A process (also referred to as an information processing method) to be performed by information processing device 10 will be described below.

Figure 3:
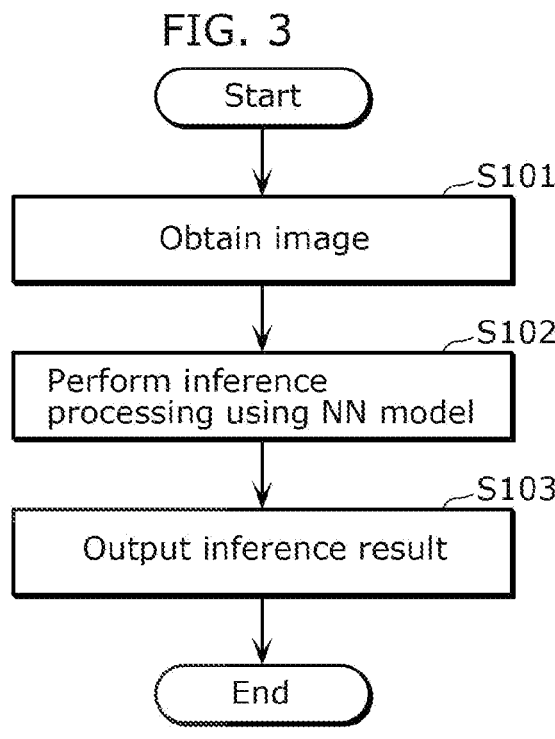
FIG. 3 is a flow diagram showing a process of the information processing device according to the embodiment.

FIG. 3 is a flow diagram showing the process of information processing device 10 according to the present embodiment. The process shown in FIG. 3 is an example of inference processing using a deep neural network, which is performed by information processing device 10.

In step S101, obtainer 11 obtains an image and provides the image to processor 12 (more specifically, inferencer 121).

In step S102, inferencer 121 performs the inference processing using neural network model 15 on the image provided by obtainer 11 in step S101. Postprocessor 122 applies the postprocessing to the result of the inference processing performed by inferencer 121.

In step S103, outputter 13 outputs the result of the inference processing performed in step S102.

The process shown in FIG. 3 enables information processing device 10 to reduce the load of the processing for adjusting the size of the image.

Training processing of the neural network model according to the present embodiment will be described below.

Figure 4:
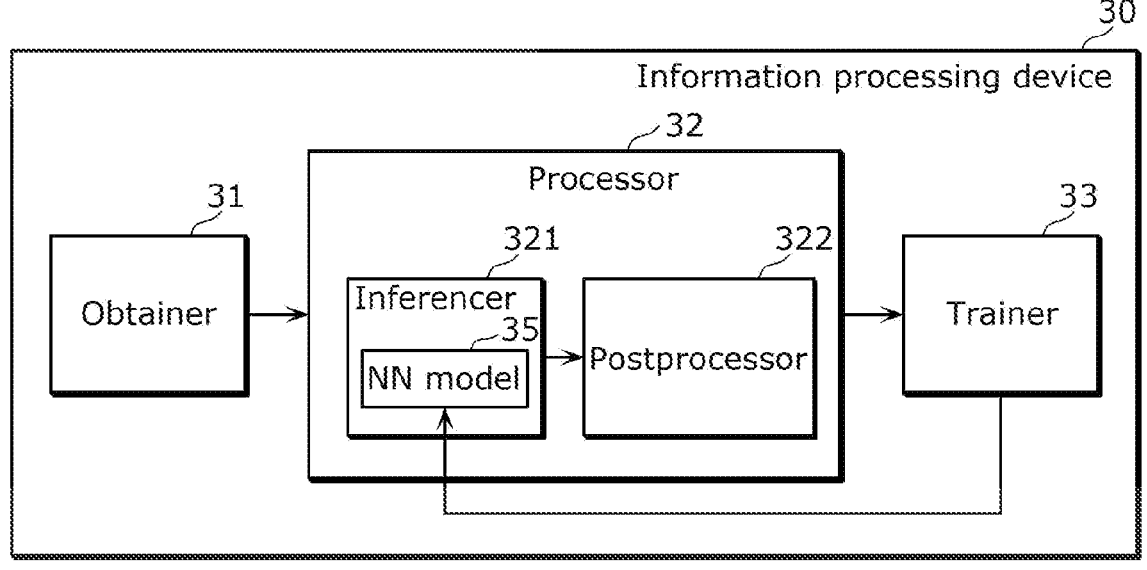
FIG. 4 is an explanatory diagram showing a configuration of an information processing device according to the embodiment.

FIG. 4 is an explanatory diagram showing a configuration of information processing device 30 according to the present embodiment. Information processing device 30 is shown as a configuration example of an information processing device that performs training processing of a deep neural network.

As shown in FIG. 4, information processing device 30 includes obtainer 31, processor 32, and trainer 33.

Obtainer 31 obtains images for training neural network model 35 (also referred to as training images) and correct answer information. Such training images are each, for example, a full high-definition image, i.e., an image of 1920 pixels×1080 pixels, but not limited to this. Such training images are preprepared images. The correct answer information is information that is associated with the training images and that should be outputted by processor 32 as results of inference processing on those training images. If the inference processing is processing for detecting an object in an image, the correct answer information may be information indicating whether the object is in the image.

Obtainer 31 may obtain the training images from a device external to information processing device 30 via a communication interface (not shown) or by reading images stored in a storage device (not shown) provided by information processing device 30. The number of training images obtained by obtainer 31 is, for example, thousands to tens of thousands or more. Obtainer 31 provides the obtained training images to processor 32.

Processor 32 performs the inference processing using neural network model 35 on the training images provided by obtainer 31. Processor 32 provides, to trainer 33, information indicating the result of the inference processing performed. The inference processing is the same as the inference processing performed by processor 12 of information processing device 10. Neural network model 35 having completed training by information processing device 30 can be used as neural network model 15 of information processing device 10.

Processor 32 includes inferencer 321 and postprocessor 322.

Inferencer 321 receives an image as an input and performs the inference processing using neural network model 35 on the image received. Neural network model 35 is a deep neural network model. Layers in neural network model 35 have the same configuration as those in neural network model 15 (see FIG. 2A).

Postprocessor 322 processes result information indicating the result of the inference processing performed by inferencer 321. The processing performed by postprocessor 322 is the same as the processing performed by postprocessor 122.

Trainer 33 trains neural network model 35 by adjusting parameters of the layers that neural network model 35 has. Trainer 33 compares the output information obtained by the inference processing performed by processor 32 with the correct answer information obtained from obtainer 31, and adjusts the parameters of the layers in neural network model 35 so that the output information approaches the correct answer information.

Information processing device 30 adjusts the parameters of the layers in neural network model 35 by trainer 33 using the training images. Neural network model 35 thus adjusted is used as neural network model 15 in processor 12 of information processing device 10.

Figure 5:
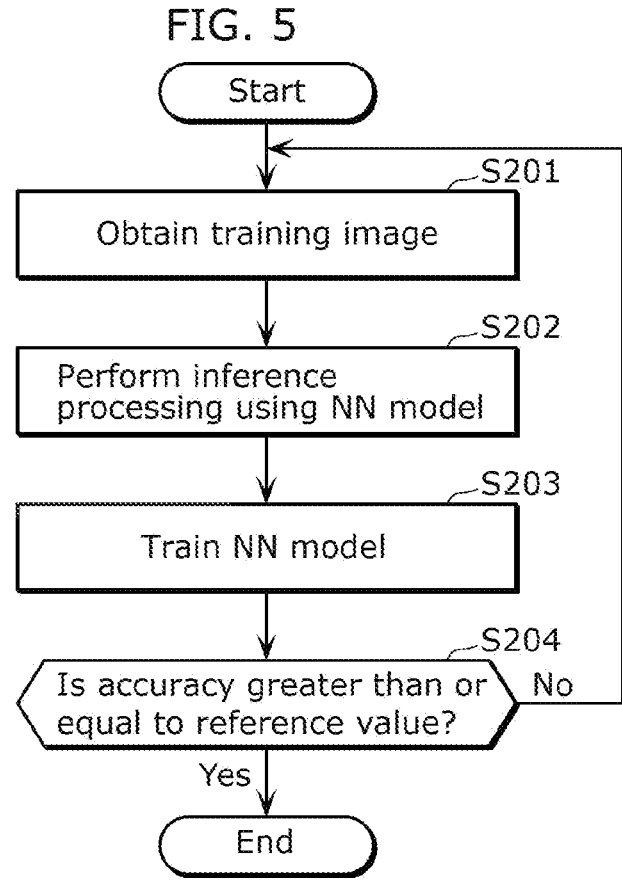
FIG. 5 is a flow diagram showing a process of the information processing device according to the embodiment.

FIG. 5 is a flow diagram showing a process of information processing device 30 according to the present embodiment. The process shown in FIG. 5 is an example of the training processing using the deep neural network, which is performed by information processing device 30.

In step S201, obtainer 31 obtains a training image and provides the training image to processor 32 (more specifically, inferencer 321).

In step S202, inferencer 321 performs the inference processing using neural network model 35 on the training image provided by obtainer 31 in step S201. Postprocessor 322 applies postprocessing to the result of the inference processing performed by inferencer 321.

In step S203, trainer 33 trains neural network model 35 using the result of the inference processing in step S202.

In step S204, trainer 33 determines whether the accuracy of the inference processing performed by neural network model 35 is greater than or equal to a reference value. The accuracy of the inference processing refers to, for example, mean Average Precision (mAP) in object detection. The reference value can be a value in a range of 60% to 90%, for example, when mAP is used as the accuracy of the inference processing. If the accuracy of the inference processing is determined to be greater than or equal to the reference value (Yes in step S204), the process shown in FIG. 5 is terminated. If not (No in step S204), step S201 is executed again.

Neural network model 35 is trained by the process shown in FIG. 5.

A technology (also referred to as a comparative example) related to information processing device 10 and information processing device 30 according to the present embodiment will be described below. In an information processing device according to the comparative example, a processor includes a preprocessor with a function of adjusting an image size, and a neural network model has no function of adjusting an image size.

Inference processing using the neural network model according to the comparative example will be described below.

The information processing device according to the comparative example differs from information processing device 10 in that the information processing device according to the comparative example includes processor 92 instead of processor 12. A configuration of processor 92 will be described below.

Figure 6:
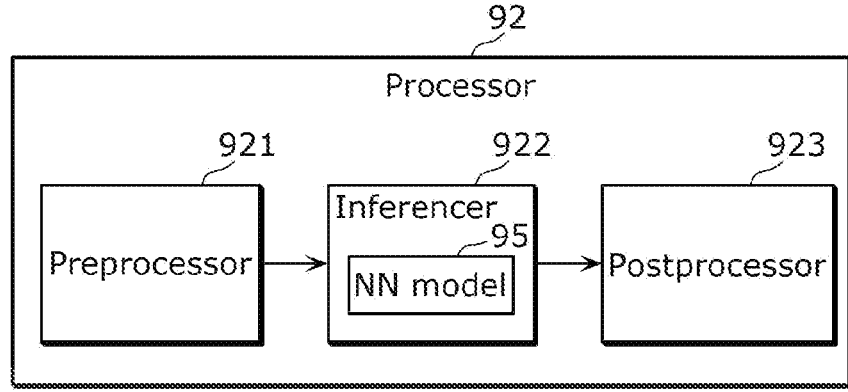
FIG. 6 is an explanatory diagram showing a configuration of a processor according to a comparative example.
Figure 7:
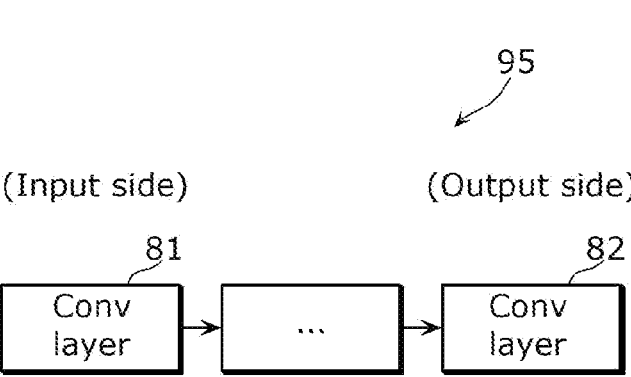
FIG. 7 is an explanatory diagram showing a configuration of a neural network model according to the comparative example.

FIG. 6 is an explanatory diagram showing the configuration of processor 92 according to the comparative example. FIG. 7 is an explanatory diagram showing a configuration of neural network model 95 according to the comparative example.

Processor 92 is an example of a processor that performs inference processing using neural network model 95. Before such inference processing, preprocessing including size adjustment processing is performed.

Processor 92 performs the inference processing using neural network model 95 on an image provided by an obtainer. Processor 92 provides, to outputter 13, information indicating the result of the inference processing performed.

As shown in FIG. 6, processor 92 includes preprocessor 921, inferencer 922, and postprocessor 923.

Preprocessor 921 receives an image as an input and performs the preprocessing on the image received. The preprocessing includes processing for adjusting the size of the image to a size suitable for the inference processing using neural network model 95. Examples of the processing for adjusting the size of the image include a method using linear approximation. Preprocessor 921 provides, to inferencer 922, the image having been subjected to the preprocessing.

Inferencer 922 receives the image as an input and performs the inference processing using neural network model 95 on the image received. Neural network model 95 is a deep neural network model.

As shown in FIG. 7, neural network model 95 includes Conv layers 81 and 82 from an input side toward an output side. Each layer performs a convolution operation using a filter on an input value inputted to the layer and outputs a value obtained as a result of the operation.

Conv layers 81 and 82 are the same as Conv layers 23 and 24 included in neural network model 15 of information processing device 10. Note that one or more Conv layers or PWConv layers may be included between Conv layer 81 and Conv layer 82, as is the case with Conv layer 23 and Conv layer 24 in information processing device 10.

Postprocessor 923 processes result information indicating the result of the inference processing performed by inferencer 922. Postprocessor 923 is the same as postprocessor 122 of information processing device 10.

Figure 8:
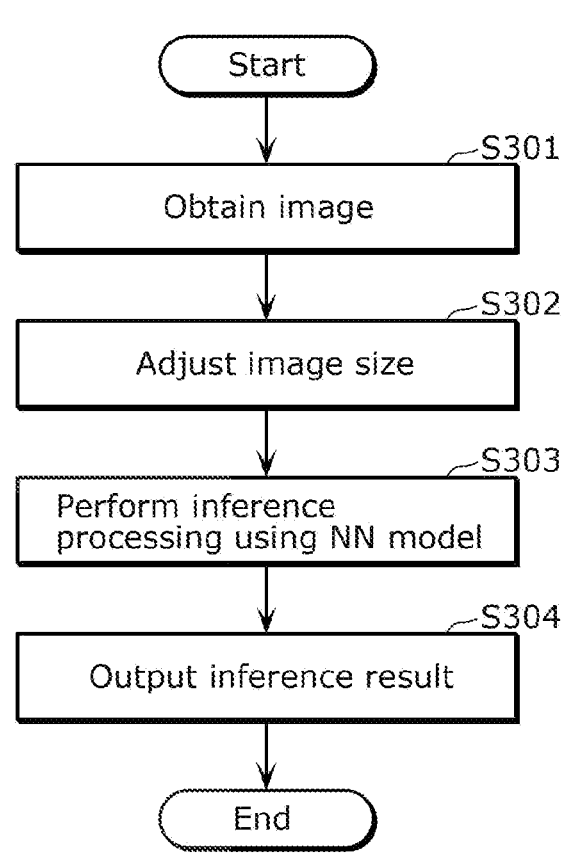
FIG. 8 is a flow diagram showing a process of an information processing device according to the comparative example.

FIG. 8 is a flow diagram showing a process of the information processing device according to the comparative example. The process shown in FIG. 8 is an example of the inference processing using the deep neural network, which is performed by the information processing device.

In step S301, the obtainer obtains an image and provides the image to processor 92 (more specifically, preprocessor 921).

In step S302, preprocessor 921 applies, as preprocessing, the above processing for adjusting the size of the image to the image provided by the obtainer in step S301, and provides the preprocessed image to inferencer 922.

In step S303, inferencer 922 performs the inference processing using neural network model 95 on the image provided by preprocessor 921 in step S302. In addition, postprocessor 923 performs postprocessing on the result of the inference processing performed by inferencer 922.

In step S304, the outputter outputs the result of the inference processing performed in step S303.

Generally, the time required for the size adjustment processing for an image is relatively long. For example, it may take 50 milliseconds to adjust the size of a full high-definition image to an image size of 960 pixels×540 pixels. If the size adjustment processing takes a relatively long time, the execution of the subsequent inference processing will be delayed, resulting in a delay in the output of the result of the inference processing.

Training processing of the neural network model according to the comparative example will be described below.

Figure 9:
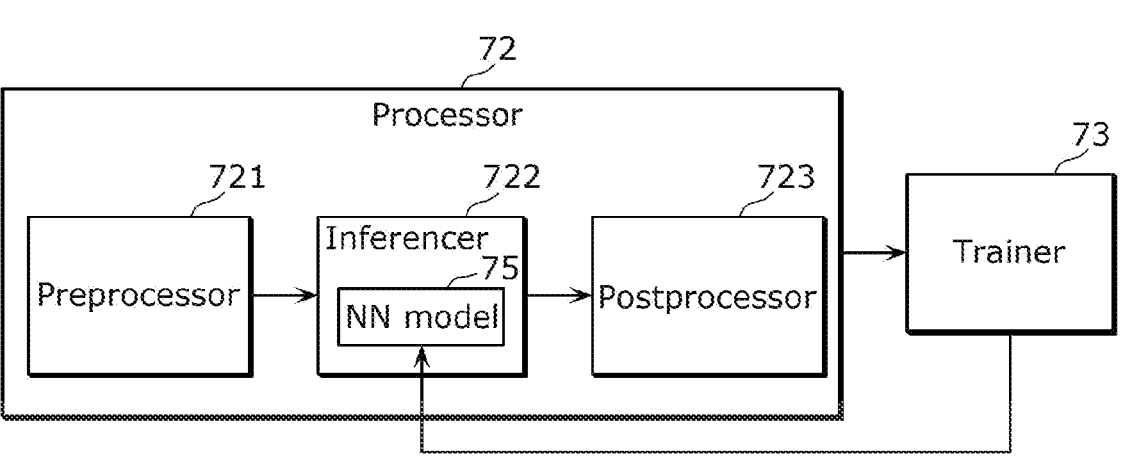
FIG. 9 is an explanatory diagram showing a configuration of a processor according to the comparative example.

FIG. 9 is an explanatory diagram showing a configuration of processor 72 according to the comparative example. Processor 72 is shown as a configuration example of a processor provided by an information processing device that performs the training processing of the deep neural network.

The information processing device according to the comparative example differs from information processing device in that the information processing device according to the comparative example includes processor 72 instead of processor 32. The configuration of processor 72 will be described below.

Processor 72 performs inference processing using neural network model 75 on a training image provided by an obtainer. Processor 72 provides, to trainer 73, information indicating the result of the inference processing performed. The inference processing is the same as the inference processing performed by processor 92. Neural network model 75 having been subjected to the training processing can be used as neural network model 95 in processor 92.

Processor 72 includes preprocessor 721, inferencer 722, and postprocessor 723.

Preprocessor 721 receives an image as an input and performs preprocessing on the image received. The preprocessing is the same as that performed by preprocessor 921. Preprocessor 721 provides, to inferencer 722, the image having been subjected to the preprocessing.

Inferencer 722 receives the image as an input and performs the inference processing using neural network model 75 on the image received. Neural network model 75 is a deep neural network model. Layers in neural network model 75 have the same configuration as those in neural network model 95 (see FIG. 7).

Postprocessor 723 processes result information indicating the result of the inference processing performed by inferencer 722. The processing performed by postprocessor 723 is the same as the processing performed by postprocessor 923.

Trainer 73 trains neural network model 75 by adjusting parameters of the layers that neural network model 75 has. Trainer 73 compares the output information obtained by the inference processing performed by processor 72 with correct answer information obtained from the obtainer, and adjusts the parameters of the layers in neural network model 75 so that the output information approaches the correct answer information.

Trainer 73 adjusts the parameters of the layers in neural network model 75 using the training images. Neural network model 75 thus adjusted is used as neural network model 95 in processor 92.

Figure 10:
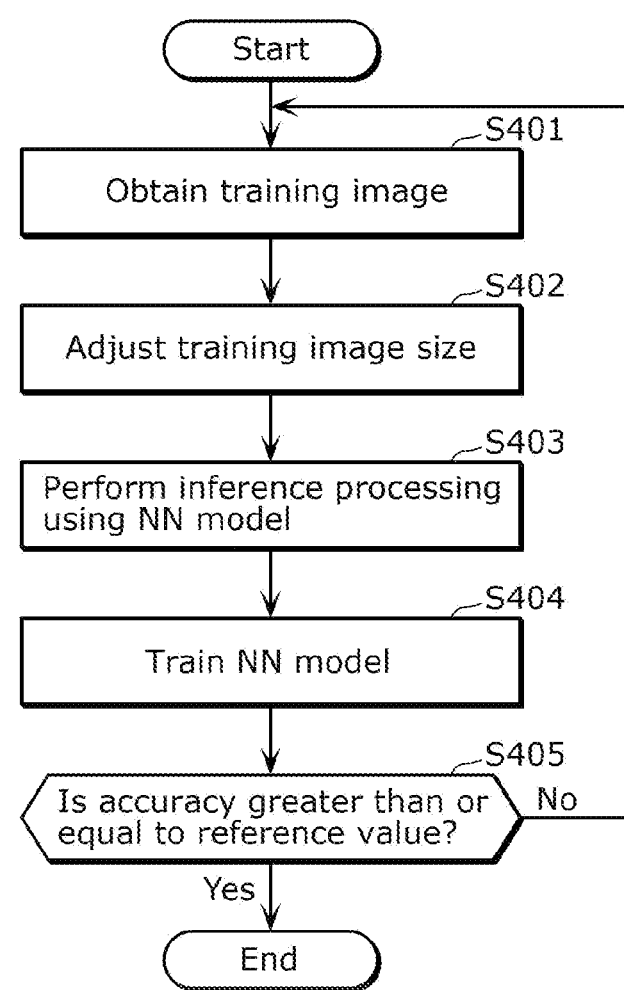
FIG. 10 is a flow diagram showing a process of an information processing device according to the comparative example.

FIG. 10 is a flow diagram showing a process of the information processing device according to the comparative example. The process shown in FIG. 10 is an example of the training processing using the deep neural network, which is performed by the information processing device.

In step S401, the obtainer obtains a training image and provides the training image to processor 72 (more specifically, preprocessor 721).

In step S402, preprocessor 721 applies, as preprocessing, the above processing for adjusting the size of an image to the image provided by the obtainer in step S401, and provides the preprocessed image to inferencer 722.

In step S403, inferencer 722 performs the inference processing using neural network model 75 on the image provided by preprocessor 721 in step S402. In addition, postprocessor 723 performs postprocessing on the result of the inference processing performed by inferencer 722.

In step S404, trainer 73 trains neural network model 75 using the result of the inference processing in step S403.

In step S405, trainer 73 determines whether the accuracy of the inference processing performed by neural network model 75 is greater than or equal to a reference value. The accuracy of the inference processing and the reference value are the same as those in information processing device 30. If the accuracy of the inference processing is determined to be greater than or equal to the reference value (Yes in step S405), the process shown in FIG. 10 is terminated. If not (No in step S405), step S401 is executed again.

The inference accuracy and processing time of information processing device 10 according to the present embodiment will be described below.

Figure 11:
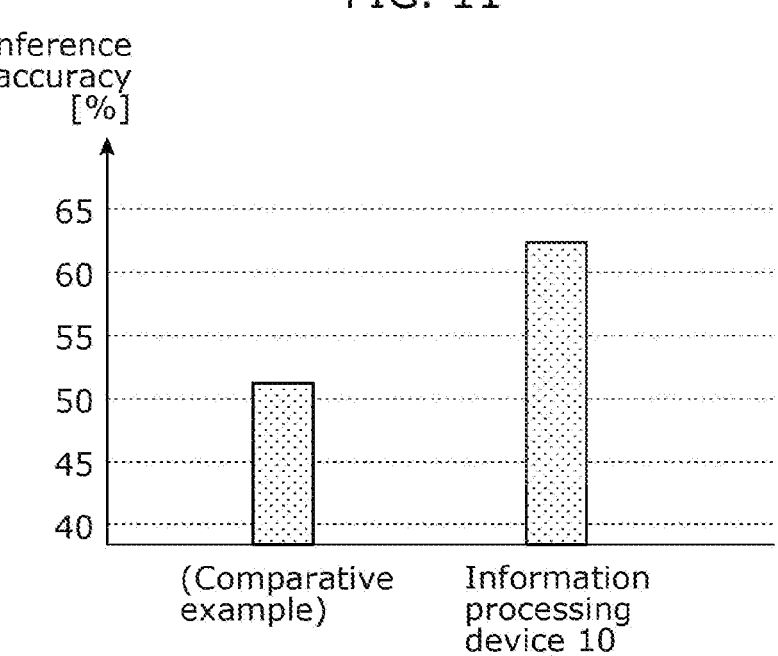
FIG. 11 is an explanatory diagram showing an example of inference accuracy of the information processing device according to the embodiment.

FIG. 11 is an explanatory diagram showing an example of the inference accuracy of information processing device 10 according to the present embodiment. FIG. 11 shows an example of the inference accuracy of information processing device 10 and an example of the inference accuracy of the information processing device according to the comparative example.

As shown in FIG. 11, the inference accuracy of the information processing device according to the comparative example is about 51%, and the inference accuracy of information processing device 10 is about 62%.

As just described, the inference accuracy of information processing device 10 is not inferior to that of the information processing device according to the comparative example. The addition of trained parameters, resulting from the size adjustment in the DWConv layer, makes the inference accuracy of information processing device 10 higher than that of the information processing device according to the comparative example.

Figure 12:
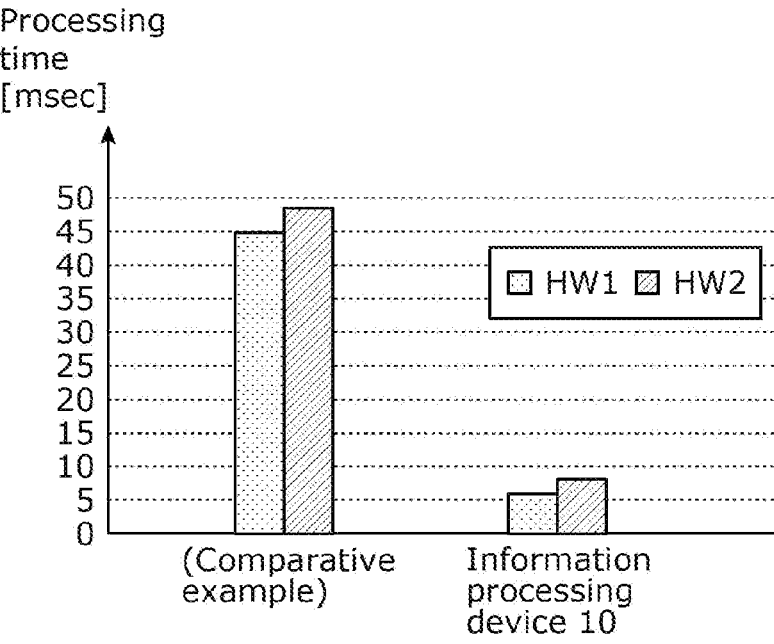
FIG. 12 is an explanatory diagram showing examples of processing time of the information processing devices according to the embodiment.

FIG. 12 is an explanatory diagram showing examples of processing time required for the inference processing of information processing devices 10 according to the present embodiment.

FIG. 12 shows the examples of the processing time of information processing devices 10, which are built with two pieces of hardware HW1 and HW2, respectively, and examples of processing time of the information processing devices according to the comparative example, which are built with the two pieces of hardware HW1 and HW2, respectively. The processing time is the time required for the inference processing for a single image. More specifically, in the case of information processing device 10, the processing time is the time required for the inference processing performed by inferencer 121 and the postprocessing performed by postprocessor 122 with respect to a single image. In the case of the information processing device according to the comparative example, the processing time is the time required for the preprocessing performed by preprocessor 921, the inference processing performed by inferencer 922, and the postprocessing performed by postprocessor 923 with respect to a single image.

As shown in FIG. 12, the processing time of the information processing device according to the comparative example, which is built with hardware HW1, is about 45 msec, and the processing time of information processing device 10, which is built with hardware HW1, is about 6 msec. The processing time of the information processing device according to the comparative example, which is built with hardware HW2, is about 48 msec, and the processing time of information processing device 10, which is built with hardware HW2, is about 8 msec.

As just described, with either hardware, the processing time of information processing device 10 is shorter than that of the information processing device according to the comparative example, specifically, about 1/7.5 times shorter in the case of hardware HW1 and about ⅙ times shorter in the case of hardware HW2.

Specific configuration examples of neural network model 15 in information processing device 10 according to the present embodiment will be described below.

FIG. 13 is an explanatory diagram showing specific configuration examples of the neural network model according to the present embodiment.

Seven specific configuration examples of layers in neural network model 95 according to the comparative example are shown in (a) of FIG. 13. A type of each layer (a Conv layer, a DWConv layer, and a PWConv layer) and a stride (in parentheses) of that layer are shown in (a) of FIG. 13.

Seven examples #1 to #7 shown in (a) of FIG. 13 correspond to well-known neural network models Mobile-NetV1, MobileNetV2, MobileNetV3, EfficientNetV1, EfficientNetV2, VoVNet, and GENet, respectively.

For example, the neural network model of example #1 shown in (a) of FIG. 13 has a Conv layer with a stride of two, a DWConv layer with a stride of one, a PWConv layer with a stride of one, a DWConv layer with a stride of two, . . . in order from the input side.

Seven specific configuration examples of layers in neural network model 15 according to the present embodiment are shown in (b) of FIG. 13.

Seven examples #1 to #7 shown in (b) of FIG. 13 are based on seven examples #1 to #7 shown in (a) of FIG. 13, respectively, but the layers located closest to the input layers of neural network models 15 are set to be DWConv layers with a stride of two. The second and subsequent layers in seven examples #1 to #7 shown in (b) of FIG. 13 are the same as the first and subsequent layers in seven examples #1 to #7 shown in (a) of FIG. 13, respectively.

For example, the neural network model of example #1 shown in (b) of FIG. 13 has a DWConv layer with a stride of two, a Conv layer with a stride of two, a DWConv layer with a stride of one, a PWConv layer with a stride of one, . . . in order from the input side.

In the embodiment described above, each component may be configured as dedicated hardware or may be implemented by executing a software program suitable for each component. Each component may be implemented by a program executer, such as a CPU or a processor, reading and executing a software program recorded on a recording medium, such as a hard disk or a semiconductor memory. Here, the software for implementing, for example, the information processing device according to the above embodiment is the following program.

Specifically, the program is a program for causing a computer to execute an information processing method to be performed by an information processing device. The information processing method includes: receiving an image as an input and performing inference processing using a neural network model on the image received; and processing result information indicating a result of the inference processing to output an output value, and the neural network model includes one or more DWConv layers each with a stride of two or more as one or more layers located closest to an input layer among a plurality of layers included in the neural network model.

While the information processing device, etc., according to one or more aspects of the present disclosure have been described above based on the embodiment, the present disclosure is not limited to this embodiment. Forms obtained by making various modifications to the above embodiment that can be conceived by those skilled in the art, as well as forms obtained by combining structural components in different embodiments, without materially departing from the spirit of the present disclosure, may be included in the scope of the one or more aspects of the present disclosure.

While the embodiment has been described herein above, it is to be appreciated that various changes in form and detail may be made without departing from the spirit and scope of the present disclosure as presently or hereafter claimed.

Further Information about Technical Background to this Application

The disclosure of the following patent application including specification, drawings, and claims are incorporated herein by reference in their entirety: Japanese Patent Application No. 2022-192249 filed on Nov. 30, 2022.

INDUSTRIAL APPLICABILITY

The present disclosure is applicable to an information processing device that performs object detection processing to detect an object that may be in an image.

The invention claimed is:

1. An information processing device, comprising:
one or more memories; and
circuitry, coupled to the one or more memories, wherein the circuitry, in operation:
receives an image as an input and performs inference processing using a neural network model on the image received;
processes result information indicating a result of the inference processing; and
outputs an output value based on the processing of the result information,
wherein the neural network model includes a plurality of layers, the plurality of layers including:
a first convolutional layer of the neural network model which receives the image as an input, wherein the first convolutional layer is a depthwise convolution (DWConv) layer having a stride of two or more; and
a convolution (Conv) layer subsequent to the first convolutional layer among the plurality of layers included in the neural network model.

2. The information processing device according to claim 1, wherein the plurality of layers of the neural network model include one or more Conv layers each with a stride of two or more subsequent to the first convolutional layer among the plurality of layers included in the neural network model.

3. The information processing device according to claim 1, wherein the circuitry receives a full high-definition image as the image.

4. The information processing device according to claim 1, wherein the plurality of layers of the neural network model include one or more DWConv layers adjacent to the first convolutional layer among the plurality of layers included in the neural network model.

5. An information processing method to be performed by an information processing device, the information processing method comprising:
receiving an image as an input and performing inference processing using a neural network model on the image received;
processing result information indicating a result of the inference processing; and
outputting an output value based on the processing of the result information, wherein the neural network model includes a plurality of layers, the plurality of layers including:
a first convolutional layer of the neural network model which receives the image as an input, wherein the first convolutional layer is a depthwise convolution (DWConv) layer having a stride of two or more; and
a convolution (Conv) layer subsequent to the first convolutional layer among the plurality of layers included in the neural network model.

6. The information processing device according to claim 1, wherein the plurality of layers of the neural network model include one or more DWConv layers each with a stride of one or more subsequent to the Conv layer among the plurality of layers included in the neural network model.

7. The information processing device according to claim 2, wherein,
the DWConv layer, in operation, adjusts an image size, and
the one or more Conv layers, in operation, perform inference processing on adjusted image data.

8. The information processing device according to claim 1, comprising:
a communication interface coupled to the circuitry, wherein the communication interface, in operation:
receives the image; and
outputs the output value.

* * * * *